March 11, 1958     G. A. LYON     2,826,458
WHEEL COVER
Filed Sept. 28, 1953     2 Sheets-Sheet 1
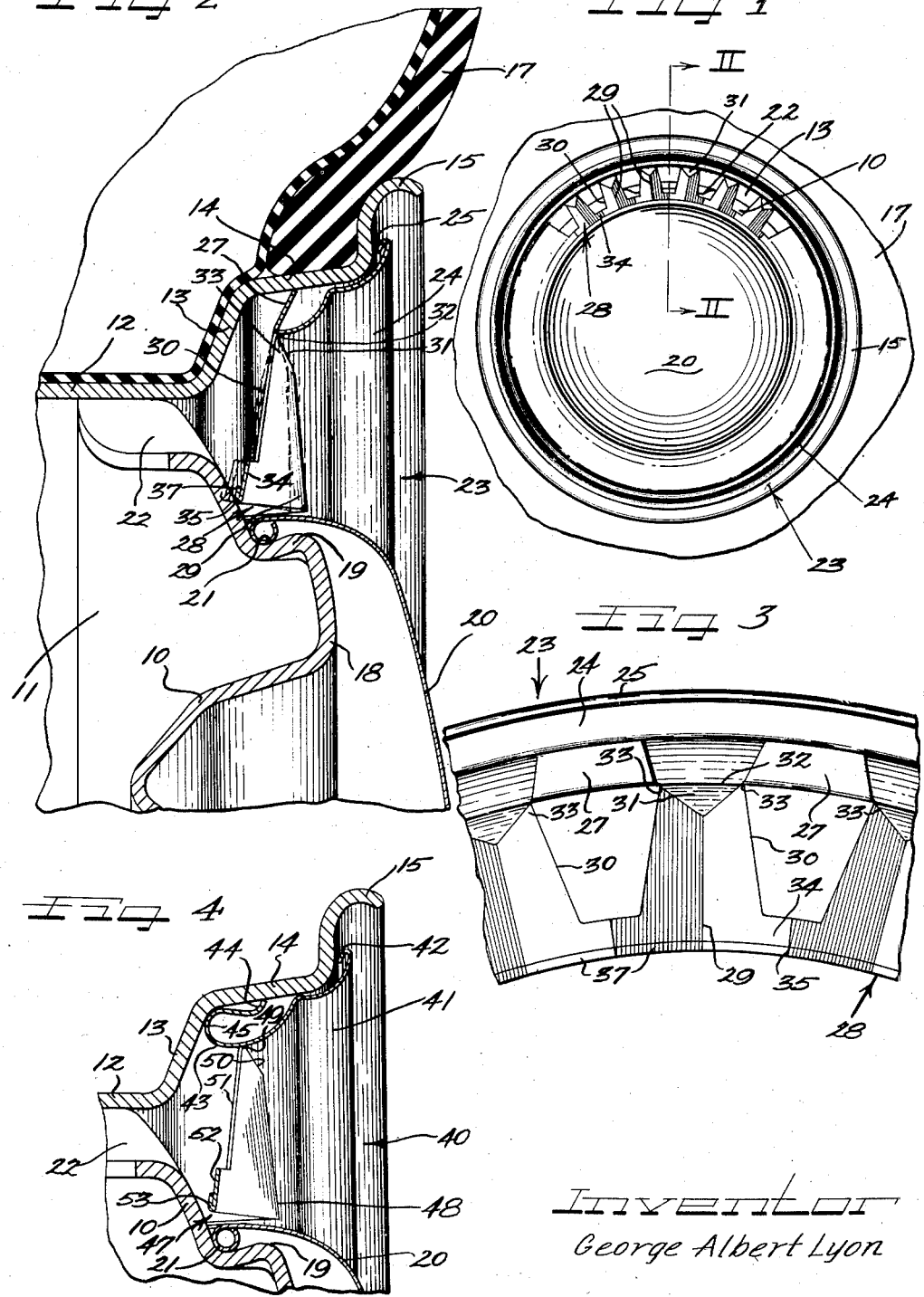
Inventor
George Albert Lyon March 11, 1958
G. A. LYON
2,826,458
WHEEL COVER
Filed Sept. 28, 1953
2 Sheets-Sheet 2
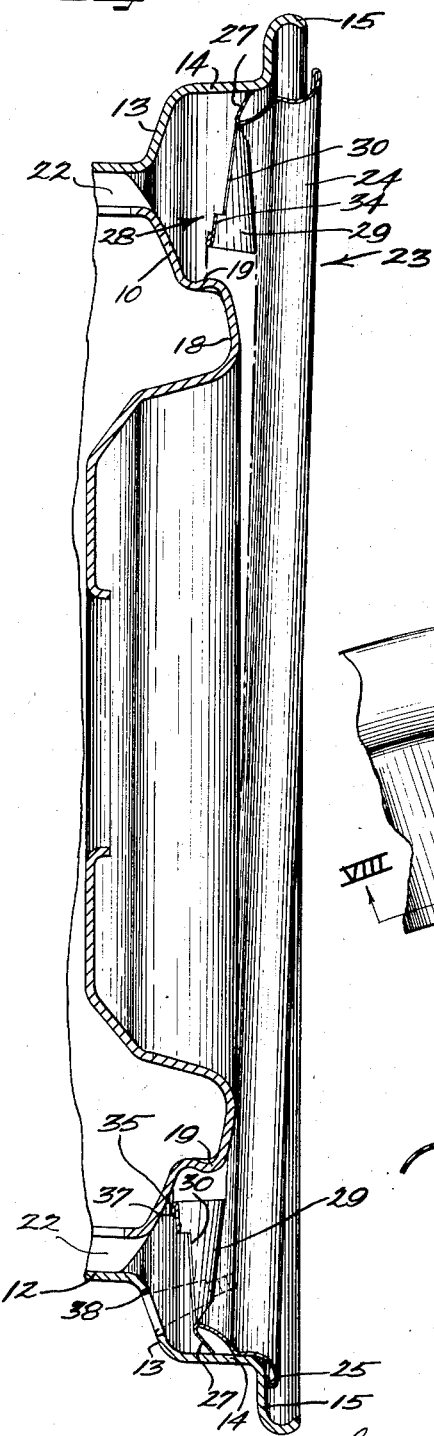
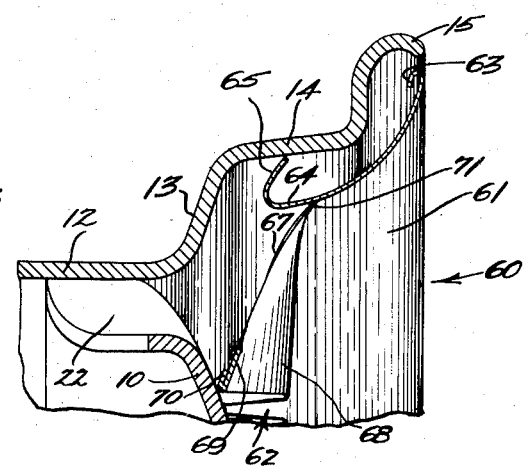
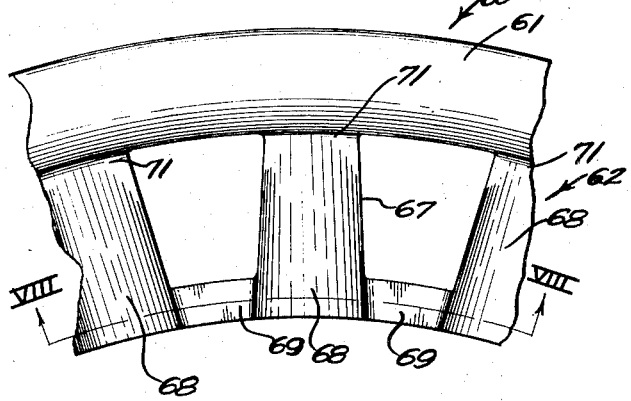
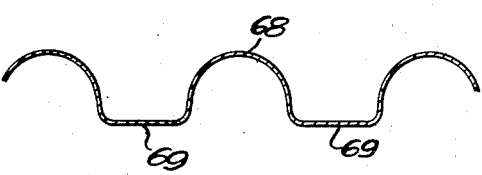
Inventor
George Albert Lyon

United States Patent Office 2,826,458
Patented Mar. 11, 1958

2,826,458

WHEEL COVER

George Albert Lyon, Detroit, Mich.

Application September 28, 1953, Serial No. 382,556

10 Claims. (Cl. 301—37)

The present invention relates to improvements in wheel structures and more particularly concerns the ornamental and protective covering of the outer sides of vehicle wheels.

An important object of the present invention is to provide an improved wheel trim construction.

Another object of the invention is to provide a wheel structure with novel trim ring means.

A further object of the invention is to provide an improved self-retaining trim ring construction for vehicle wheels which will cooperate with a hub cap on the wheel to afford the appearance of an all-over cover on the wheel.

Still another object of the invention is to provide an improved wheel structure including a trim ring extending over a tire rim and a portion of the wheel body of a wheel and affording circulation openings cooperative with wheel openings in the wheel.

A still further object of the invention is to provide a novel trim ring construction having a tire rim engaging portion and a wheel body engaging portion relatively flexibly axially adjustable.

Other objects, features and advantages of the present invention will be readily apparent from the following detailed description of certain preferred embodiments thereof taken in conjunction with the accompanying drawings in which:

Figure 1 is a side elevational view of a vehicle wheel embodying features of the invention;

Figure 2 is an enlarged fragmentary radial sectional view taken substantially on the line II—II of Figure 1;

Figure 3 is a fragmentary inner side elevational view of the trim ring of Figures 1 and 2;

Figure 4 is a radial sectional view similar to Figure 2 but showing a modification;

Figure 5 is a diametrical sectional view through a vehicle wheel showing the trim ring of Figures 1 and 2 in process of being applied to the wheel;

Figure 6 is a radial sectional view similar to Figures 2 and 4 but showing a further modification;

Figure 7 is an outer side fragmentary plan view of the trim ring of Figure 6; and Figure 8 is a sectional detail view taken substantially on the line VIII—VIII of Figure 7.

The present invention may be applied to a vehicle wheel comprising a disk spider wheel body 10 having a marginal attachment flange 11 attached in suitable manner to a tire rim comprising a base flange 12, a generally radially angled outer side flange 13, a generally axially outwardly angled intermediate flange 14 and a terminal flange 15. The tire rim is of the multi-flange drop-center type adapted for supporting a pneumatic tire and tube assembly 17.

In the present instance, the wheel body 10 is provided with an annular axially outwardly projecting nose bulge 18 provided at its radially outer side with a series of hub cap retaining radially projecting bumps 19 by which a hub cap 20 is retainable in snap-on, pry-off relation through the engagement of a marginal underturned resiliently flexible reinforcing bead 21 with the bumps. As will be observed in Fig. 2, the bumps 19 are disposed in substantially radially inwardly spaced relation to appropriate inset areas in the attachment flange 11 affording air circulation wheel openings 22 through the wheel in conjunction with the base flange 12 of the tire rim.

Ornamentally and protectively disposed over the tire rim and the portion of the wheel body which remains uncovered by the hub cap 20, is a trim ring member 23 of novel construction. For overlying the tire rim, the trim ring 23 comprises an annular portion 24 of substantially rigid construction. By preference the outer annular trim ring portion 24 is of undulating cross-section comprising a plurality of annular reinforcing ribs, with the outer extremity of the ring portion turned under to provide a reinforcing and finishing flange or bead 25.

The diameter of the trim ring is such that the portion 24 will substantially overlie the inner portion of the terminal flange 15 and extend generally radially and axially inwardly past the juncture of the terminal and intermediate flanges and into spaced relation to the intermediate flange substantially as shown in Fig. 2.

For retaining the trim ring on the wheel, a series of generally radially and axially outwardly angled biting retaining fingers 27 are provided on the inner extremity of the innermost rib section of the annular portion 24 of the trim ring. There may be, for example, twenty-five of the retaining fingers 27. These retaining fingers extend integrally in one piece from the ring portion 24 and are concealed behind the inner rib thereof. Normally the tips of the fingers 27 extend to a diameter slightly greater than the inside diameter of the intermediate flange 14. Hence, attachment of the trim ring 23 to the wheel is effected by generally axially inwardly pressing the trim ring so that the retaining fingers 27 enter into tensioned, biting, retaining engagement with the inner surface of the intermediate flange 14 of the tire rim.

According to the present invention, the trim ring 23 is provided with an inner annular portion 28 which is adapted to extend generally radially inwardly from the inner extremity portion of the outer trim ring section 24 into overlying relation to the side flange 13 of the tire rim, the wheel openings 22 and the portion of the wheel body 10 intervening between the edge of the hub cap 20 and the tire rim. By preference, the inner annular portion or section 28 of the trim ring is so constructed and related to the outer annular section 24 of the trim ring that in the application of the trim ring to the wheel, the inner annular section 28 acts to enhance the cover-retaining grip of the retaining fingers 27. To this end, the inner annular portion 28 of the trim ring is constructed for resilient, tensioned engagement with the wheel body, while nevertheless affording a structure that is self-equalizing with respect to flexure tensions that may develop therein as a result of pressing against the wheel body, so that uniform, symmetrical ornamental appearance is maintained at all times. Another desirable feature of the inner annular trim ring section or portion 28 is that provision is made for air circulation therethrough, cooperatively with respect to the wheel openings 22. Additionally, the inner annular trim ring section 28 affords generally the appearance of radial spokes for the outer side of the wheel.

To the accomplishment of the various features just mentioned, the radially inner trim ring portion or section 28 is constructed to provide a uniform series of generally radially inwardly extending, generally axially outwardly humped rib-like portions 29 of generally corrugation structure. There are preferably the same number of the rib portions 29 as there are retaining fingers 27, disposed in alternating relation with the retaining fingers. However, the retaining fingers 27 are wider than the adjacent radially outer ends of the ribs 29, as best visualized in Fig. 3.

By having the radially outer ends of the inner section ribs 29 fairly narrow and separated one from the other by openings 30 between adjacent ribs and aligned radially with the retaining fingers 27, relatively flexible juncture with the outer annular portion or section 24 of the trim ring is attained. This flexibility is further enhanced by providing the radially outer end portions of the ribs 29 with tapered, preferably oblique respective outer terminal sections 31 which merge at an indented hinge juncture 32 with the inner edge of the trim ring outer annular section 24. As observed in Figures 2 and 3, the hinge junctures 32 are preferably substantially co-circular with the junctures of the retaining fingers 37 with the outer annular section 24 of the trim ring. Through this arrangement, not only are the radially outer ends of the ribs 29 reasonably resiliently flexible relative to the outer trim rim section 24, while at the same time the ribs 29 function to resist radially inward deflection of the inner margin of the outer trim ring section 24 by virtue of co-action of spur-like brace terminals 33 at the sides of the ribs coacting with the outer section at the respective proximate ends of the retaining finger junctures.

As best seen in Figs. 1 and 2, the apertures 30 in the inner retaining ring section 28 are preferably symmetrically-shaped, herein of generally keystone outline and with the inner terminal portions of the ribs 29 integrally connected continuously by narrow transverse linking portions or webs 34 providing generally axially inwardly directed respective abutment shoulders 35 adapted in assembly with the wheel to engage compressively against the wheel body as shown in Fig. 2. Improved compression-resisting strength is afforded for the shoulders 35, and a finished, reinforced inner edge is provided for the inner trim ring section 28 by underturning the inner extremity of the inner section to provide a continuous underturned reinforcing flange 37.

Material struck out in forming the apertures 30 is utilized in forming the retaining fingers 27. By having the apertures 30 with their widest dimension at the extremities of the ribs 29, the base or juncture portions of the retaining fingers 27 are correspondingly of maximum width, while the tip portions of the fingers may taper to a narrower width, thus rendering the fingers substantially stiffer at their base portions than at their tips.

In Figure 5 is demonstrated one mode of applying the trim ring 23 to the wheel. Initially the trim ring is manipulated to bring one of the apertures 30 opposite a valve stem aperture 38 in the tire rim side wall flange 13, as seen at the bottom of Fig. 5. The trim ring is maneuvered into position so that a valve stem extending through the valve stem aperture 38 will project through the registering aperture 30. At this time the retaining finger 27 associated with the valve stem accommodating aperture will engage against the intermediate flange 14 at substantially its final engaging relation with the intermediate flange, as determined by axially inward limit upon the relative position of such retaining finger by engagement of the outer marginal bead 25 of the trim ring with the terminal flange 15 of the tire rim. Then, the trim ring is swung inwardly from the canted position shown and pushed home until it is concentric with the wheel and all of the retaining fingers 27 assume their retaining, biting engagement with the intermediate flange 14.

In the final assembled relationship of the trim ring 23 with the wheel, the several compression shoulders 35 thrust against the wheel body 10. This result is assured by having the inner end portions of the ribs 29 tilted generally axially inwardly to a substantial extent as indicated in dash outline in Fig. 2 so that the thrust or compression shoulders 35 will extend axially inwardly beyond the inwardly offset relation of the portion of the wheel body engageable thereby relative to the limit of inward relative disposition of the outer annular trim ring portion in full assembly with the wheel. Hence, in the final increment of axially inward movement of the outer trim ring section 24, the thrust shoulders 35 stop against the wheel body while the outer annular trim ring section continues to move axially inwardly. As this occurs, the ribs 29 tend to straighten out or tilt out about the hinge junctures 32 which tend to resist such tilting by gradually increasing resilient tension. At the same time, the radially inner extremity of the inner trim ring section 28 uniformly contracts as enabled by the undulating or generally corrugated circumferential section thereof, with corresponding resilient tensioning of the inner section 28. The total effect is a tensioning reaction wherein the bracing terminals 33 thrust toward the outer trim ring section 24 and thereby brace the same against radially inward deflection as a result of tensioned retaining thrust of the retaining fingers 27 against the intermediate flange 14 of the tire rim. Further, the resilient tension developed in the inner trim ring portion 28 as a result of the thrust of the shoulders 35 against the wheel body reacts to resiliently lever generally axially outwardly against the inner portion of the outer trim ring section 24, thereby reacting in a manner to tend to dislodge the retaining fingers 27. However, since the retaining fingers 27 are in biting relation to the intermediate flange 14, any tendency toward dislodging the fingers only causes them to bite harder and thus more thoroughly resist removal from the intermediate flange. The biting retention of the retaining fingers is thereby improved by the resilient leverage imposed by the inner trim ring section 28 and more particularly the ribs 29 thereof in service.

As best seen in Figs. 1 and 2, the apertures 30 overlie the wheel openings 22 and thereby afford circulation of air through the trim ring and the wheel openings.

In the modification shown in Figure 4, the wheel and the hub cap are substantially identical with the wheel and hub cap of Figure 2 and therefore similar reference numerals have been applied to indicate identical parts. However, a trim ring 40 of modified construction in cooperation with the wheel has been shown. This trim ring comprises an annular outer trim ring portion 41 of preferably multi-rib substantially rigid construction having a turned outer marginal flange 42 adapted to overlie the inner portion of the terminal flange 15, while the body of the outer annular portion or section 41 extends generally axially and radially inwardly in spaced relation to the intermediate flange 14. At its inner extremity the portion 41 is adapted to lie in spaced relation opposite the side flange 13 of the tire rim and has integrally in one piece therewith generally axially inwardly extending retaining fingers 43 of generally C shape. The fingers 43 extend generally axially inwardly and then are turned generally radially outwardly and axially outwardly and terminate in short and stiff generally radially outwardly extending tire rim engaging terminal flanges 44. At their axially innermost turned portion, the fingers 43 provide a relatively small radius shoulder 45 which in full application of the trim ring on the wheel is adapted to engage against the center flange 13 adjacent juncture thereof with the intermediate flange 14. This provides a positive stop upon axially inward movement of the trim ring in applying the same to the wheel.

Extending generally radially inwardly from the inner extremity of the annular outer section 41 of the trim ring is an inner annular section 47 which in most respects corresponds to the inner annular section 28 of the trim ring 23 previously described. To this end the section 47 comprises a series of generally undulating, corrugation-like axially outwardly projecting humped ribs 48 connected to the outer section 41 at an indented juncture 49 toward which a flattened diagonal or oblique terminal portion 50 of the respective ribs 48 merges. Between the ribs 48 and in line with the retaining fingers 43 which have been derived from the metal struck out in providing the same is a series of apertures 51 closed at their inner ends by connecting webs 52. The inner extremity of the section 47 is reinforced by means of an underturned reinforcing and finishing flange 53.

In applying the cover 40 to the wheel, the fingers 45, which initially have the terminals 44 extending to a greater diameter than the inside diameter of the intermediate flange 14, are engaged against the tire rim at the outer margin of the intermediate flange 14 and the trim ring is pressed inwardly until the shoulders 45 of the retaining fingers 43 bottom against the side flange. The relationship is preferably such that the inner edge of the inner section 47 of the trim ring remains out of engagement with the tire rim, although untensioned engagement will be permissible. The reason for avoiding development of compression tension in the inner section 47 is to avoid stressing the retaining fingers 43 axially outwardly since with the fingers 43 it is practicable to pry the trim ring free from the wheel by inserting a pry-off tool behind the turned outer edge 42 and exerting pry-off leverage so as to slide the terminals 44 of the fingers 43 out of engagement with the intermediate flange 14. Therefore, pressure exerted by the inner section 47 would tend in service to cause the fingers to move outwardly and thereby loosen the trim ring unintentionally.

In the modification shown in Figures 6, 7 and 8, a trim ring 60 of modified construction is shown as applied to a wheel the construction of which may be substantially the same as in Figure 2 and therefore similar reference numerals have been applied to corresponding parts thereof.

Similarly as in the trim rings 23 and 40, the trim ring 60 comprises an outer annular tire rim covering section 61 and an inner wheel body opposing section 62. The outer annular section is of preferably generally convex-concave structure in cross-section adapted to overlie the terminal flange 15 and extending generally radially and axially inwardly opposite the intermediate flange 14 of the tire rim and terminating in spaced relation to the side flange 13. At its outer margin the outer section 61 has a turned under reinforcing and finishing flange 63. Extending generally axially inwardly from the inner terminal portion of the outer section 61 is a series of retaining fingers 64 having generally axially outwardly and radially outwardly extending terminal flanges 65 which engage edgewise in retaining gripping relation with the inner side of the intermediate flange 14. The retaining fingers 64 are derived from material struck out in providing a series of generally keystone shaped apertures 67 in the inner annular section 62 and intervening between a uniform series of generally radially extending axially outwardly projecting ribs 68 intervening between the fingers 64.

As will be observed best in Figures 7 and 8, the ribs 68 taper toward a narrower width at their radially outer ends where they join the outer annular section 61 and are of arcuate, generally semi-cylindrical cross-section. Connecting the ribs 68 at their inner end portions and closing the inner sides of the openings 67 are connecting webs 69 which may be substantially flat. The inner edge of the section 62 is reinforced by an underturned flange 70 (Fig. 6). At their inner ends the ribs 60 merge preferably on a radius indented juncture 71 with the adjacent edge of the outer section 61 and thus are relatively flexibly hingedly movable relative to the outer section 61 but under substantial resilient resistance to flexure.

In applying the trim ring 60 to the wheel, the trim ring is pressed inwardly until the inner ends of the ribs 68 as defined by the connecting webs 69 which extend generally radially and axially inwardly substantially beyond the axial extent of the retaining fingers 64, engage against the wheel body 10. This limits axially inward disposition of the trim ring and acts to hold the outer section 61 out of contact with the terminal flange 15 so as to afford substantial space therebehind for wheel balancing weights that may be applied to the terminal flange 15. It will be observed that the openings 67 are so dimensioned radially that they overlie the wheel openings 22 for air circulation purposes.

In all forms of the trim ring they may be made from suitable sheet metal such as stainless steel, brass or the like and appropriately finished either by plating and polishing or burnishing and certain portions may be painted to afford desirable ornamental effects. In each form of the trim ring the radially extending ribs afford substantially the appearance of spokes intervening between the outer annular section of the trim ring and the hub cap and generally as though emanating from the side of the hub cap.

Since in order to disengage the hub cap 20 from the wheel it is necessary to apply a pry-off tool such as a screwdriver or the like (not shown) behind the reinforcing and retaining bead 21 thereof, it will be observed that the valleys between the corrugated-like inner margin of the trim ring in each instance as provided by the inner ends of the spoke ribs and the intervening connecting web portions between the diverging side walls of the ribs, afford ready access to the hub cap bead so that pry-off tool pressure can be exerted thereagainst. As a result, it is not necessary to remove the trim ring in any instance in order to remove the hub cap.

It will be understood that modifications and variations may be effected without departing from the scope of the novel concepts of the present invention.

I claim as my invention:

1. In a wheel structure including a tire rim and a wheel body having wheel openings adjacent to the tire rim, a trim ring for the outer side of the wheel comprising an outer annular portion for overlying the tire rim and an inner annular portion for overlying the wheel body, said inner annular portion having a series of openings therein for circulation of air therethrough and the wheel openings and also having a series of rib-like generally radially extending portions intervening between the openings, and ring-retaining fingers behind the outer annular portion engageable with the tire rim and derived from material struck from the inner annular portion in forming said openings, said rib-like portions having on the radially outer ends thereof generally triangularly shaped portions in bracing relation to the contiguous portions of the outer annular portion and to the adjacent sides of the ring-retaining fingers.

2. In a wheel structure including a tire rim and a wheel body having wheel openings adjacent to the tire rim, a trim ring for the outer side of the wheel comprising an outer annular portion for overlying the tire rim and an inner annular portion for overlying the wheel body, said inner annular portion having a series of openings therein for circulation of air therethrough and the wheel openings and also having a series of rib-like generally radially extending portions intervening between the openings, and ring-retaining fingers behind the outer annular portion engageable with the tire rim and derived from material struck from the inner annular portion in forming said openings, said rib-like portions having tapering radially outer terminals merging with the outer annular trim ring portion and spur-like brace terminals at the sides of the rib-like portions in bracing relation to the adjacent sides of the retaining fingers.

3. In a wheel structure including a tire rim and a wheel body having wheel openings adjacent to the tire rim, a trim ring for the outer side of the wheel comprising an outer annular portion for overlying the tire rim and an inner annular portion for overlying the wheel body, said inner annular portion having a series of openings therein for circulation of air therethrough and the wheel openings and also having a series of rib-like generally radially extending portions intervening between the openings, and ring-retaining fingers behind the outer annular portion engageable with the tire rim and derived from material struck from the inner annular portion in forming said openings, said rib-like portions having tapering radially outer terminals merging with the outer annular trim ring portion and spur-like brace terminals at the sides of the rib-like portions in bracing relation to the adjacent sides of the retaining fingers, the inner ends of the rib-like portions bearing against the wheel body under compression resulting in resilient tensioning of the rib-like portions reacting against the outer annular trim ring portion.

4. In a cover for disposition at the outer side of a vehicle wheel, an annular radially outer portion and a radially inner portion comprising generally radially extending axially outwardly humped ribs, said ribs having tapering radially outer end portions merging with the outer annular portion, the sides of said ribs joining the outer annular portion on spur-like brace portions at the respective opposite sides of said tapering portion.

5. In a cover for disposition at the outer side of a vehicle wheel, an annular radially outer portion and a radially inner portion comprising generally radially extending axially outwardly humped ribs, said ribs having tapering radially outer end portions merging with the outer annular portion, the sides of said ribs joining the outer annular portion on spur-like brace portions at the respective opposite sides of said tapering portion, said outer annular portion having retaining fingers projecting therebehind and having the sides of the retaining fingers disposed in braced relation to said brace portions.

6. In a cover for disposition at the outer side of a vehicle wheel, an annular radially outer portion and a radially inner portion comprising generally radially extending axially outwardly humped ribs, said ribs having tapering radially outer end portions merging with the outer annular portion, the sides of said ribs joining the outer annular portion on spur-like brace portions at the respective opposite sides of said tapering portion, said outer annular portion having retaining fingers projecting therebehind and having the sides of the retaining fingers disposed in braced relation to said brace portions, said ribs being separated by openings from which material has been struck in providing said fingers.

7. In a cover for disposition at the outer side of a vehicle wheel, an annular radially outer portion and an annular radially inner portion having an inner edge and comprising generally radially extending axially outwardly humped ribs having diverging sides extending to and comprising part of said edge at their inner ends, said ribs having tapering radially outer end portions merging with the outer annular portion, the sides of said ribs joining the outer annular portion on spur-like brace portions at the respective opposite sides of said tapering portion, said outer annular portion having retaining fingers projecting therebehind and having the sides of the retaining fingers disposed in braced relation to said brace portions, said ribs being separated by openings from which material has been struck in providing said fingers, said sides of the ribs being connected at the radially inner side of said openings for mutual stability.

8. In a trim ring for disposition at the outer side of a vehicle wheel, a substantially rigidly reinforced annular radially outer portion, and a radially inner portion comprising a series of separated ribs integrally connected to the radially inner side of said outer portion and humped axially outwardly, the radially inner ends of the ribs providing part of the inner edge of the trim ring and said ribs being connected at their inner end portions by transverse integral connecting webs of the material of the ring and being thus in mutually resilient stabilizing relation.

9. In a wheel structure including a tire rim and a wheel body arranged for engagement therewith of a hub cap, a trim ring member for overlying the tire rim and the portion of the wheel body intervening between the hub cap and the tire rim, said trim ring including a substantially rigid annular body portion for overlying the tire rim and having therebehind cover retaining means for press-on engagement with the tire rim, and a series of radially inwardly extending ribs projecting from said annular portion to overlie the wheel body over said intervening portion thereof and affording the appearance of spokes emanating from the side of the hub cap which the inner ends of the ribs at least closely approach, said ribs having flexible connections with the rigid annular cover portion and bottoming at their radially inner ends under tension with the wheel body as deflected from a more axially inward disposition normally relative to the press-on retaining means.

10. In a wheel structure including a tire rim and a wheel body with a hub cap for snap-on, pry-off disposition over the wheel body spaced from the tire rim and having a pry-off edge overlying the wheel body, a trim ring member for overlying the tire rim and the portion of the wheel body intervening between the hub cap and the tire rim, said trim ring including a substantially rigid annular body portion for overlying the tire rim and having therebehind cover retaining means for press-on engagement with the tire rim, and a series of radially inwardly extending ribs projecting from said annular portion to overlie the wheel body over said intervening portion thereof and affording the appearance of spokes emanating from the side of the hub cap which the inner ends of the ribs at least closely approach, said inner ends of the ribs providing axially outer peak portions disposed substantially axially outwardly relative to the pry-off edge of the hub cap and substantial valleys between the peaks with axially inner portions disposed adjacent to the wheel body and affording direct access by means of a pry-off tool in said valleys and between said peaks to the pry-off edge of the hub cap for prying the hub cap free from the wheel without removal of the trim ring.

References Cited in the file of this patent

UNITED STATES PATENTS

| | | |
|---|---|---|
| D. 167,271 | McLeod | July 15, 1952 |
| 2,308,617 | Lyon | Jan. 19, 1943 |
| 2,308,618 | Lyon | Jan. 19, 1943 |
| 2,312,568 | Lyon | Mar. 2, 1943 |
| 2,368,238 | Lyon | Jan. 30, 1945 |
| 2,574,491 | Lyon | Nov. 13, 1951 |
| 2,639,948 | Grimshaw | May 26, 1953 |